US007007039B2

(12) United States Patent
Chaudhuri et al.

(10) Patent No.: US 7,007,039 B2
(45) Date of Patent: Feb. 28, 2006

(54) METHOD OF BUILDING MULTIDIMENSIONAL WORKLOAD-AWARE HISTOGRAMS

(75) Inventors: Surajit Chaudhuri, Redmond, WA (US); Nicolas Bruno, New York, NY (US); Luis Gravano, New York, NY (US)

(73) Assignee: Microsoft Corporation, Redmond, WA (US)

( * ) Notice: Subject to any disclaimer, the term of this patent is extended or adjusted under 35 U.S.C. 154(b) by 274 days.

(21) Appl. No.: 09/881,500

(22) Filed: Jun. 14, 2001

(65) Prior Publication Data
US 2002/0198896 A1    Dec. 26, 2002

(51) Int. Cl.
*G06F 17/30*    (2006.01)
(52) U.S. Cl. .......................................... 707/200; 707/5
(58) Field of Classification Search .................... 707/4,
707/102, 103 R, 104.1, 200, 3, 1, 2, 5; 716/4;
709/206, 223, 227, 228, 224; 713/152, 201;
345/589, 601, 733; 706/19
See application file for complete search history.

(56) References Cited

U.S. PATENT DOCUMENTS

| | | | | |
|---|---|---|---|---|
| 5,870,752 | A * | 2/1999 | Gibbons et al. | 707/102 |
| 5,920,870 | A * | 7/1999 | Briscoe et al. | 707/103 R |
| 5,991,764 | A * | 11/1999 | Sundaresan | 707/102 |
| 6,353,832 | B1 * | 3/2002 | Acharya et al. | 707/104.1 |
| 6,507,840 | B1 * | 1/2003 | Ioannidis et al. | 707/4 |
| 6,772,142 | B1 * | 8/2004 | Kelling et al. | 707/3 |
| 2001/0010091 | A1 * | 7/2001 | Noy | 716/4 |

OTHER PUBLICATIONS

A. Aboulnaga and S. Chaudhuri. Self-Tuning Histograms: Building Histograms Without Looking at Data. In Proceedings of the 1999 ACM International Conference on Management of Data (SIGMOD'99), Jun. 1999.

S. Chaudhuri. An Overview of Query Optimization in Relational Systems. In Proceedings of the Seventeenth ACM SIGACT-SIGMOD-SIGART Symposium on Principles of Database Systems, Jun. 1-3, 1998, Seattle, Washington 1998.

C.M. Chen and N. Rousopoulos. Adaptive Selectivity Estimation Using Query Feedback. In Proceedings of the 1994 ACM SIGMOD International Conference on Management of Data, 1994.

D. Donjerkovic, Y. Ioannidis and R. Ramakrishnan. Dynamic Histograms: Capturing Evolving Data Sets. In Proceedings of the 16th International Conference on Data Engineering, 2000.

P.B. Gibbons, Y. Matias and V. Poosala. Fast Incremental Maintenance of Approximate Histograms. In VLDB '97, Proceedings of 23rd International Conference on Very Large Data Bases, 1997.

(Continued)

*Primary Examiner*—Mohammad Ali
*Assistant Examiner*—Etienne P. LeRoux
(74) *Attorney, Agent, or Firm*—Microsoft Corporation

(57) ABSTRACT

In a database system, a method of maintaining a self-tuning histogram having a plurality of existing rectangular shaped buckets arranged in a hierarchical manner and defined by at least two bucket boundaries, a bucket volume, and a bucket frequency. At least one new bucket is created in response to a query on the database. Each new bucket is contained within at least one existing bucket and the new bucket becomes a child bucket and the existing bucket containing it becomes a parent bucket. The boundaries of each new bucket correspond to a region of the database accessed by the query and the frequency of the new bucket is a number of data records returned by the query. Buckets may be merged based on a merge criterion such as similar bucket density when the total number of buckets exceeds the predetermined budget.

25 Claims, 7 Drawing Sheets

OTHER PUBLICATIONS

D. Gunopulos, G. Kollios, V.J. Tsotras and C. Domeniconi. Approximating Multi-Dimensional Aggregate Range Queries Over Real Attributes. In Proceedings of the 2000 ACM International Conference on Management of Data (SIGMOD'00), 2000.

H. V. Jagadish, N. Koudas, S. Muthukrishnan, V. Poosala, K.C. Sevik and T. Suel. Optimal Histograms with Quality Guarantees. In Proceedings of the Twenty-fourth International Conference on Very Large Databases (VLDB'98), 1998.

M. Muralikrishna and D.J. DeWitt. Equi-Depth Histograms for Estimating Selectivity Factors for Multidimensional Queries. In Proceedings of the 1988 ACM International Conference on Management of Data (SIGMOD'88), Jun. 1988.

M. Muthukrishnan, V. Poosala and T. Suel. On Rectangular Partitioning in Two Dimensions: Algorithms, Complexity and Applications. In Database Theory-ICDT'99, 7th International Conference, 1999.

J. Nievergelt, H. Hinterberger and K.C. Sevcik. The Grid File: An Adaptable, Symmetric Multikey File Structure. ACM Transactions on Database Systems, 9(1):38-71, Mar. 1984.

V. Poosala and Y. Ioannidis. Selectivity Estimation Without the Attribute Value Independence Assumption. In Proceedings of the Twenty-Third International Conference on Very Large Databases (VLDB '97), 1997.

V. Poosala, Y.Ioannidis, P.J. Haas and E.J. Shekita. Improved Histograms for Selectivity Estimation of Range Predicates. In Proceedings of the 1996 ACM International Conference on Management of Data (SIGMOD '96), Jun. 1996.

* cited by examiner

METHOD OF BUILDING MULTIDIMENSIONAL WORKLOAD-AWARE HISTOGRAMS

TECHNICAL FIELD

The present invention relates generally to the field of database systems. More particularly, the present invention relates to the field of histogram construction for database systems.

BACKGROUND OF THE INVENTION

Computer database systems manage the storage and retrieval of data in a database. A database comprises a set of tables of data along with information about relations between the tables. Tables represent relations over the data. Each table comprises a set of records of data stored in one or more data fields. The records of a table are also referred to as rows, and the data fields of records in a table are also referred to as columns.

A database server processes data manipulation statements or queries, for example, to retrieve, insert, delete, and modify data in a database. Queries are defined by a query language supported by the database system. To enhance performance in processing queries, database servers use information about the data distribution to help access data in a database more efficiently. Typical servers comprise a query optimizer which estimate the selectivity of queries and generate efficient execution plans for queries. Query optimizers generate execution plans based on he query and in doing so exploits statistical information on the column(s) of the table(s) referenced in the queries.

Database servers may create histograms on the columns of tables to represent the distribution of a data. A histogram is one means of representing the distribution of data in a database. A histogram on a data attribute consists generally of a set of partitions or boundaries which divide the range of data on the attribute into a set of segments or buckets. Also associated with each bucket is a frequency which corresponds to the number of data tuples which fall within the boundaries of the bucket. The frequency associated with a bucket, or bucket frequency, is an indication of the density of data within the bucket's boundaries, and should not be confused with the absolute value of the data within the bucket.

The accuracy of the estimations of the query optimizer are enhanced by the availability of histograms, however, creating and maintaining histograms can incur significant costs, particularly for large databases. This problem is particularly striking for multi-dimensional histograms that capture joint distributions of correlated data attributes. Although multidimensional histograms can be highly valuable, the relatively high cost of building and maintaining them often prevents their use.

Query optimization in relational database systems has traditionally relied on single-attribute histograms to compute the selectivity of queries. For queries that involve multiple attributes, most database systems make the attribute value independence assumption, i.e., assume that Prob(A1=v1,A2=v2)=Prob(A1=v1)×Prob(A2=v2), which may of course lead to significant inaccuracy in selectivity estimation.

An alternative to assuming attribute value independence is to use histograms over multiple attributes, which are generally referred to as multidimensional histograms. Ideally, multidimensional histograms should consist of buckets that enclose regions of the data domain with close-to-uniform tuple density. At the same time, multidimensional histograms should be sufficiently compact and efficiently computable. Unfortunately, existing multidimensional histogram construction techniques fail to satisfy these requirements robustly across data distributions.

Several techniques exist in the literature to compute selectivity estimators of multidimensional data sets. These techniques include wavelets and discrete cosine transformations, sampling, and multidimensional histograms. The V-optimal(f,f) family of histograms groups contiguous sets of frequencies into buckets and minimizes the variance of the overall frequency approximation. These histograms work well for estimating the result size of tree, function tree, equality join, and selection queries under a definition of optimality that captures the average error over all possible queries and databases. However, these histograms need to record every distinct attribute value inside each bucket, which is impractical. Moreover, the construction algorithm involves an exhaustive and exponential enumeration of all possible histograms. A more practical approach is to restrict the attention to V-optimal(v,f) histograms, which group contiguous sets of values into buckets, minimizing the variance of the overall frequency approximation. A dynamic programming algorithm has been presented for building unidimensional V-optimal(v,f) histograms in $O(N^2 b)$ time, where N is the number of tuples in the data set and b is the desired number of buckets. However, even for two-dimensional data sets, building the V-optimal(v,f) histogram using arbitrary rectangular buckets is NP-Hard. Therefore, practical static multidimensional histogram techniques use heuristics to partition the data space into buckets.

A multidimensional version of the Equi-Depth histogram recursively partitions the data domain into buckets with the same frequency, one dimension at a time. A technique called Mhist is based on MaxDiff(v,a) histograms in which the data domain is iteratively partitioned using a greedy procedure. In each step, MaxDiff(v,a) identifies the bucket in most need of partitioning and splits it along the dimension with the highest difference in frequency between consecutive values. GenHist histograms allow unrestricted overlap among buckets. If more than two buckets overlap, the density of tuples in their intersection is approximated as the sum of the data densities of the overlapping buckets. For the technique to work, a tuple that lies in the intersection of many buckets is counted in only one of them (chosen probabilistically). Progressively coarser grids are constructed over the data set and the densest cells are converted into buckets of the histogram. A certain percentage of tuples in those cells is removed to make the resulting distribution smoother.

The above discussed histogram techniques are static in the sense that after the histograms are built, their buckets and frequencies remain fixed regardless of any changes in the data distribution. One technique decides when reorganization is needed by using thresholds that depend on the number of updates over the relation or the accuracy of the histogram. For example, if the average estimation error is above a given value, the whole histogram is discarded and rebuilt from scratch. Some techniques consider histogram refinement as an alternative to periodic reconstruction. One such technique maintains a backing sample and an approximate Equi-Depth histogram in memory. During insertions and deletions, both the sample and the histogram are updated. When the Equi-Depth constraint that all bucket frequencies should be equal is violated beyond a given threshold, some buckets are split and others are merged to restore the Equi-Depth constraint.

If no reorganization can restore the constraint, the existing histogram is discarded and a new one is built from the sample. Another technique considers dynamic compressed histograms that store some values in singleton or singular buckets, while the rest are partitioned using Equi-Depth into regular buckets. The general idea is to relax histogram constraints up to a certain point, after which the histogram is reorganized so that it satisfies the constraints. For dynamic compressed histograms, a $\chi^2$ test is used to determine when to reorganize. This restructuring uses promotion from singular to regular buckets, degradation from regular to singular buckets, and redistribution of the remaining regular buckets as the only operations. These histogram techniques deal only with unidimensional data.

One parametric technique for approximating data distributions that uses feedback from the query execution engine represents the data distribution as a linear combination of model functions. The weighting coefficients of this linear combination are adjusted using feedback information and a least squares technique. This technique is dependent on the choice of model functions and assumes that the data follows some smooth and known distribution. STGrid histograms use query feedback to refine buckets. An STGrid histogram greedily partitions the data domain into disjoint buckets that form a grid, and refines their frequencies using query feedback. After a predetermined number of queries, the histogram is restructured by merging and splitting rows of buckets one at a time (to preserve the grid structure). Accuracy is traded for efficiency in histogram tuning, a goal of this technique. Since STGrid histograms need to maintain the grid structure at all times, and due to the greedy nature of the technique, some locally beneficial splits and merges have the side effect of modifying distant and unrelated regions, hence decreasing the overall accuracy.

SUMMARY OF THE INVENTION

Self-tuning histograms for databases have a plurality of existing buckets defined by at least two bucket boundaries, a bucket volume, and a bucket frequency. The results of a query executed on the database are examined and at least one candidate hole in the histogram is created based on the results of the query. Each candidate hole is modified such that the modified hole is completely contained within at least one existing parent bucket and does not partially intersect any existing bucket. A new child bucket is created in the histogram corresponding to each modified hole.

In one implementation, each bucket has a rectangular shape. The boundaries of the candidate hole correspond to a region of the database accessed by the query and the frequency of the candidate hole is a number of data records returned by the query. Buckets are merged based on a merge criterion when the total number of buckets exceeds a predetermined budget. In this implementation, the merge criterion is a similar bucket density, wherein bucket density is based on the bucket frequency divided by the bucket volume. In this implementation, the frequency of the parent bucket is diminished by the frequency of the child bucket.

DETAILED DESCRIPTION OF THE INVENTION

Figure 1:
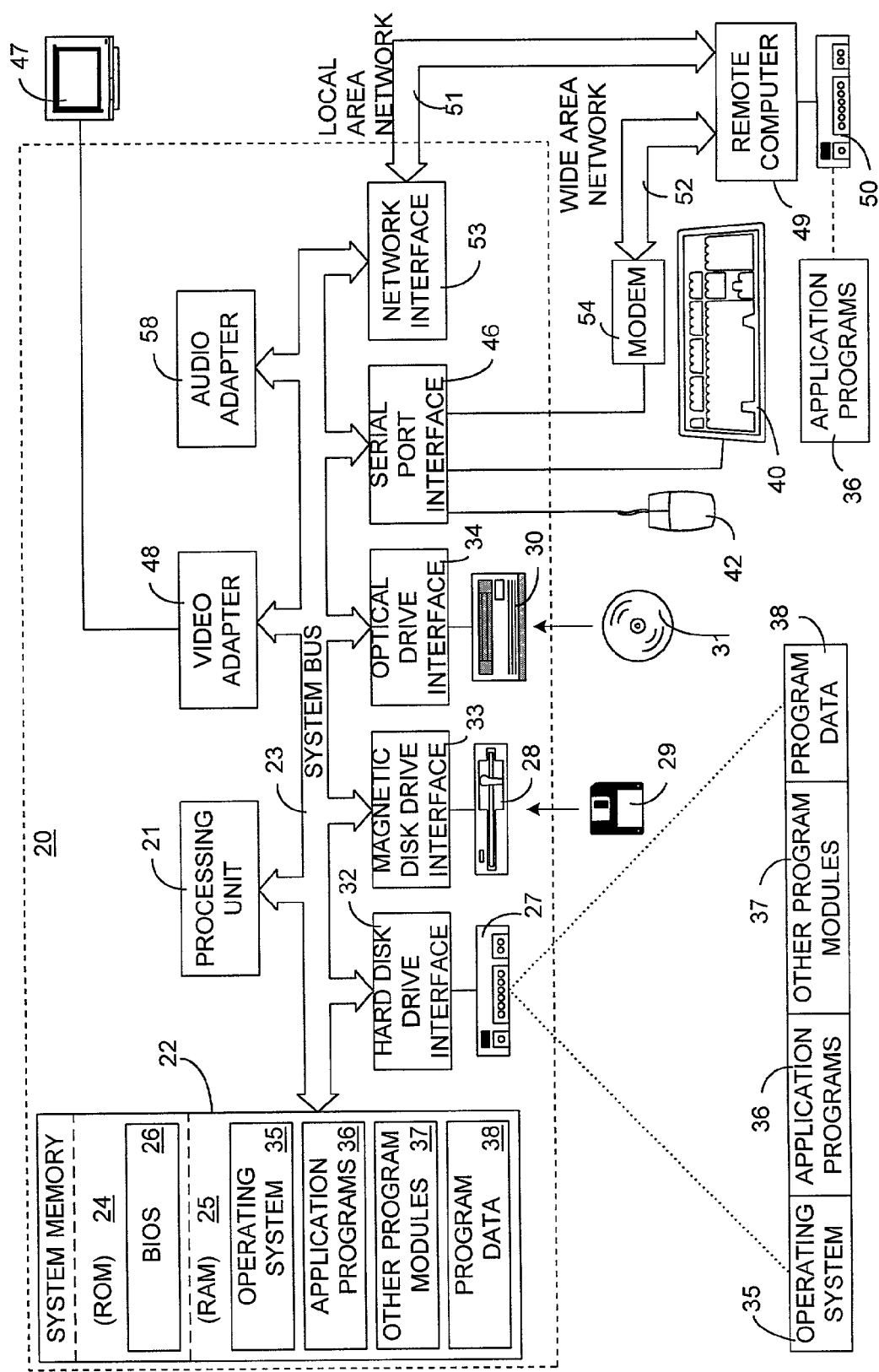
FIG. 1 is an exemplary operating environment for practice of the present invention.

With reference to FIG. 1 an exemplary embodiment of the invention is practiced using a general purpose computing device 20. Such a computing device is used to implement the database system 18 depicted in FIG. 2. The device 20 includes one or more processing units 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures.

The system memory includes read only memory (ROM) 24 and random access memory (RAM) 25. A basic input/output system 26 (BIOS), containing the basic routines that helps to transfer information between elements within the computer 20, such as during start-up, is stored in ROM 24.

The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage of computer readable instructions, data structures, program modules and other data for the computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROM), and the like, may also be used in the exemplary operating environment.

A number of program modules may be stored on the hard disk, magnetic disk 29, optical disk 31, ROM 24 or RAM 25, including an operating system 35, one or more application programs 36, other program modules 37, and program data 38. A user may enter commands and information into the computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor, personal computers typically include other peripheral output devices (not shown), such as speakers and printers.

The computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the computer 20 is connected to the local network 51 through a network interface or adapter 53. When used in a WAN networking environment, the computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used.

Figure 2:
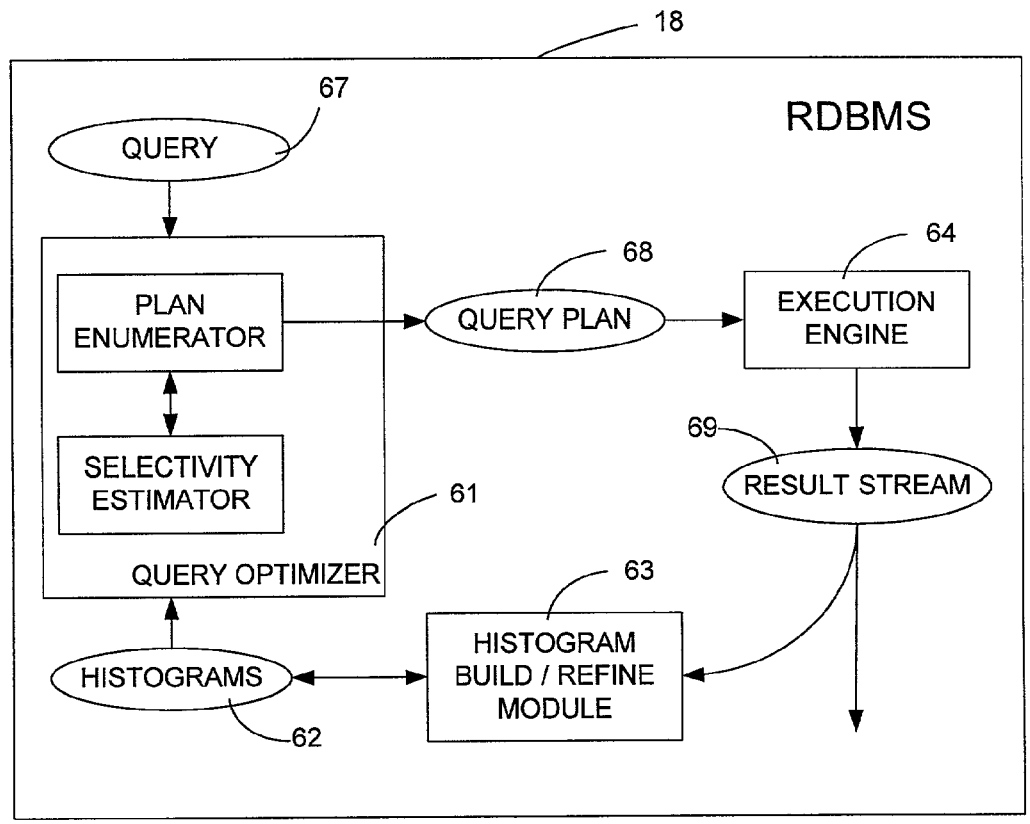
FIG. 2 is a block diagram of components used for practice of an embodiment of the invention.

FIG. 2 illustrates a block diagram of a database system 18 that features histograms 62 that are updated by an online build/refine module 63 in accordance with the present invention. When a user presents a query 67 to the database system 18, a query optimizer 61 reviews the query and develops a query plan 68 to efficiently determine the answer to the query. In developing the plan 68, the optimizer 61 uses selectivity estimations that are stored in the form of histograms 62. The execution plan is passed on to an execution engine 64 to execute the query and return a result 69 to the user. The online build/refine module 63 accesses the result 69 and in turn tunes the histograms 62 based on the query result 69.

Figure 3:
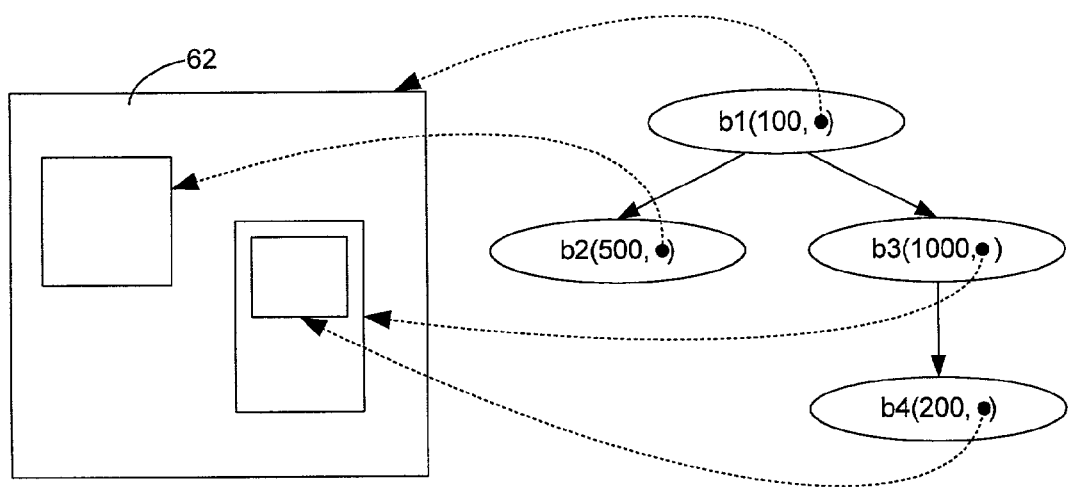
FIG. 3 is a block diagram illustrating a histogram constructed in accordance with an embodiment of the present invention.

FIG. 3 illustrates a histogram 62 that is constructed in accordance with the present invention. The histogram 62 features histogram buckets ($b_1$–$b_4$) that are in a nested configuration, such that each bucket is composed of a rectangular bounding box denoted box(b) and a real valued frequency, denoted f(b), which indicates the number of tuples enclosed by bucket b. In a traditional histogram, a bucket b would be "solid" with no "holes," and the region that b covers would be regarded as having uniform tuple density. In contrast, the histogram 62 identifies sub-regions of a bucket b with different tuple density and pulls them from b. The bucket $b_1$ has holes $b_2$–$b_4$ that are themselves histogram buckets. Buckets $b_2$–$b_4$ are children of bucket $b_1$, and their bounding boxes are disjoint and completely enclosed in bucket $b_1$. In this manner, a histogram 62 can be conceptually treated as a tree structure, where each node represents a bucket. For the purposes of this detailed description, frequencies of children buckets are pulled out of the frequency of the parent bucket, however the present invention contemplates adding the frequencies of the children buckets to that of the parent bucket.

Examining the histogram 62 in FIG. 3 more closely, the root of the histogram tree is bucket $b_1$, with frequency 100. Bucket $b_1$ has two children, buckets $b_2$ and $b_3$, with frequencies of 500 and 1,000, respectively. Bucket $b_3$ has one child, $b_4$ with frequency 200. The region associated with a particular bucket excludes that of its descendants, which can be thought of as holes in the parent space. Requiring the children buckets to be of rectangular shape allows the region modeled by the parent bucket $b_1$ to be non-rectangular. A query that covers the lower half of bucket $b_3$ will be estimated to return nearly 1,000 tuples, even when it covers half of $b_3$'s bounding box, because the other half is not really part of $b_3$. More precisely, bucket $b_4$ covers that region.

The volume of a bucket b is defined as vBox(b) $-\Sigma_{b' \in children(b)}$vBox(b') where vBox(b) is the volume of box(b). Given a histogram H over a data set D, and a range query q, the estimated number of D tuples that lie inside q, est(H,q), is:

$$est(H, q) = \sum_{b \in H} f(b) \frac{v(q \cap b)}{v(b)}$$

Where v(q∩b) denotes the volume of the intersection of q and b (not box(b)).

Figure 4:
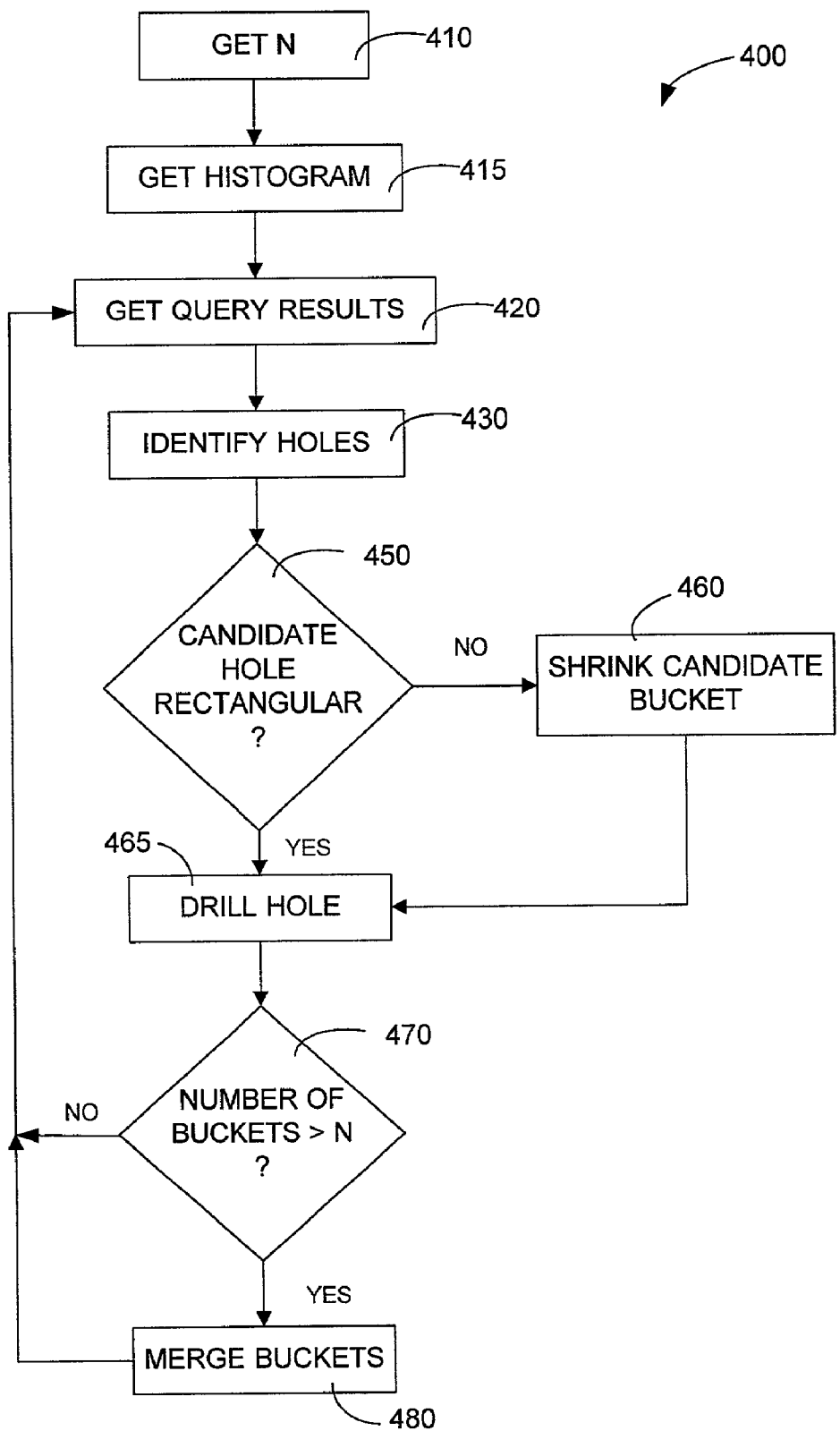
FIG. 4 is a flow diagram depicting the steps of a method for practicing an embodiment of the present invention.

FIG. 4 is a flow diagram depicting a method 400 employed by the online tuner (63 in FIG. 2) to update the histograms (62 in FIG. 2) used to in query optimization. The general idea of the method 400 is to intercept the result of queries in the workload and efficiently gather some simple statistics over them to progressively refine the layout and frequency of the existing buckets. This way, the regions that are more heavily queried will benefit from having more buckets with finer granularity. In step 410, a number N is determined that represents the total number of buckets allowed due to storage constraints. In step 415 an initial histogram is identified to be updated by the method 400. The initial histogram is a single empty "root bucket" that is expanded based on the results to queries. The initial histogram may also be a trivial histogram with only one bucket with frequency zero covering all of the data domain. Alternatively, an existing histogram may be used. In step 420 the result to a query q that is issued to the database is intercepted and the method counts the number of tuples in the result that fall within each bucket of the current histogram.

In step 430, the method identifies candidate holes based on the results of query q. Such holes correspond to a bucket's sub-regions with distinctive tuple frequency. These holes are exploited to update the histogram. In general, a query q intersects some buckets only partially. For each such bucket $b_i$, we know the exact number of tuples in q∩$b_i$ by inspecting the results for q. If q∩$b_i$ has a disproportionately large or small fraction of the tuples in $b_i$, then q∩$b_i$ is a candidate to become a hole of bucket $b_i$. Each partial intersection of q and a histogram bucket can be used to improve the quality of the histogram.

EXAMPLE 1

Figure 5:
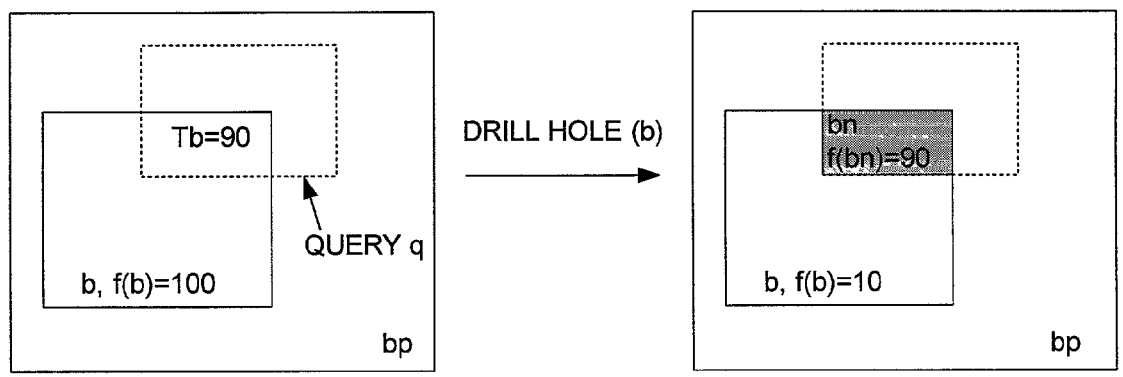
FIG. 5 is a block diagram of the practice of an aspect of the present invention.

Referring now to FIG. 5, a bucket b with frequency f(b)=100 is shown. The result stream for a query q indicates that $T_b$=90 tuples that lie within the part of bucket b that is touched by query q, q∩b. This means that bucket $b_1$ is significantly skewed, since 90% of its tuples are located in a small fraction of its volume. The accuracy of the histogram is improved if a new bucket $b_n$ is created by drilling a hole in $b_1$ that corresponds to the region $q \cap b$ and adjust $b_1$ and $b_n$'s frequencies as illustrated in FIG. 5.

If the intersection of a query q and a bucket b is rectangular as in Example 1, it is always considered a candidate hole. However, it is not always possible to create a hole in a bucket b to form a new bucket $q \cap b$. This is because the children of b might be taking some of b's space, and therefore the bounding box of $q \cap b$ may not be rectangular anymore thus violating the rectangular partitioning constraint imposed on the histogram by the method. In Example 1, FIG. 5, the intersection between q and b's parent $b_p$ has an L shape. In this case the method 400 approximates a rectangular shape by shrinking $q \cap b$ to a large rectangular sub-region that does not intersect the bounding box of any other bucket (steps 450 and 460). The number of tuples in the sub-region is estimated assuming uniformity. If $T_b$ is the number of tuples in $q \cap b$ and c is the result of shrinking $q \cap b$, $T_c$, the number of tuples in c, is estimated to be $$T_c = T_b \frac{v(c)}{v(q \cap b)}.$$

EXAMPLE 2

Figure 6:
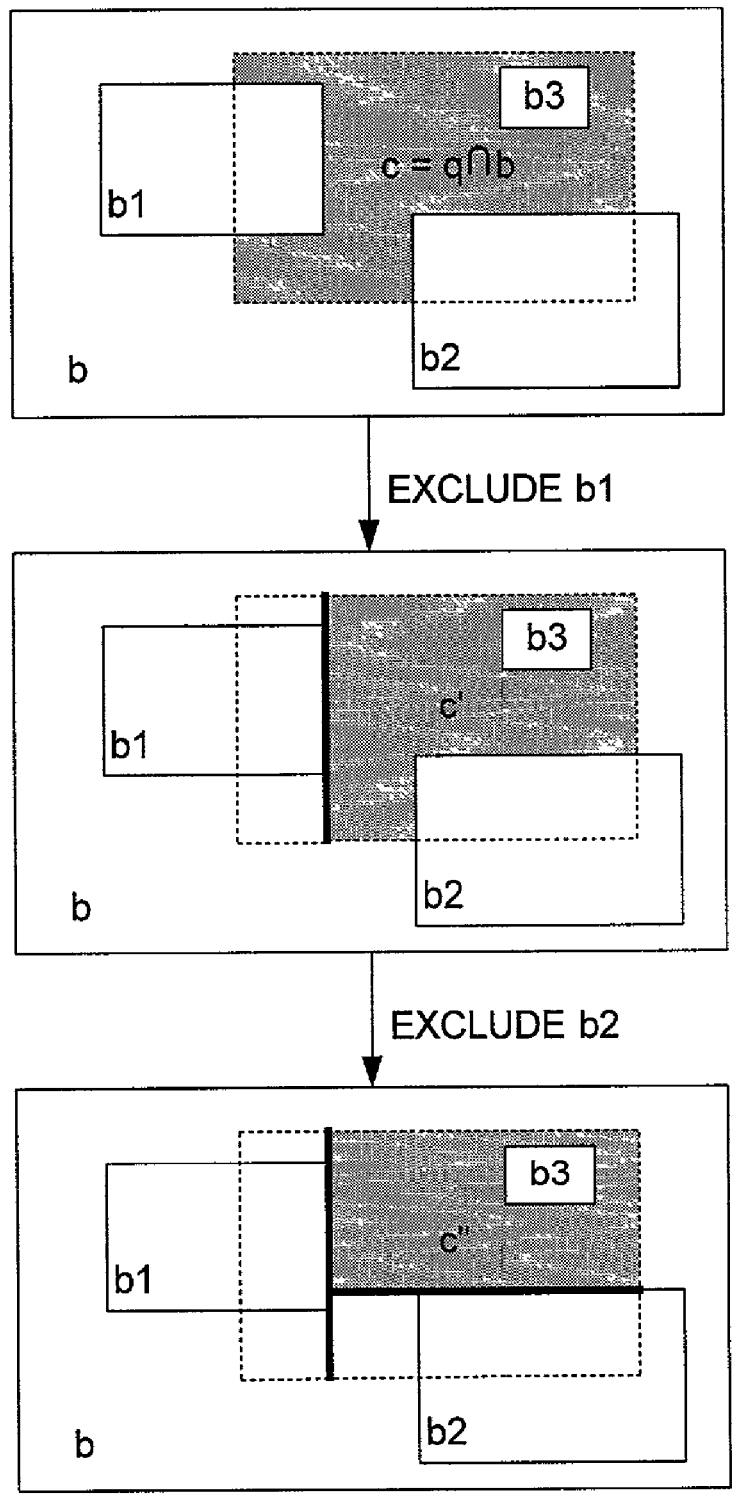
FIG. 6 is a block diagram of the practice of an aspect of the present invention.

FIG. 6 shows a four bucket histogram and the progressive shrinking of the initial candidate hole, $c = q \cap b$. The buckets that partially intersect with c, called participants in the algorithm are $b_1$ and $b_2$ ($b_3$ is completely included in c). The hole is shrunk along the vertical dimension so that the resulting candidate hole c' does not intersect with $b_1$ anymore. Then c' is shrunk along the horizontal dimension so that the resulting candidate c" does not intersect with $b_2$. At this point there is no bucket that partially intersects with c". The resulting candidate hole c" is rectangular and covers a significant portion of the original $q \cap b$ region.

After a candidate hole has been shrunk to an appropriate shape such that it does not intersect with any child of $b_i$, if necessary, the hole is drilled as a new histogram bucket in step 465 (FIG. 4). Three possible scenarios exist with respect to the drilling of a new bucket "c" in the bucket $b_i$. 1) If bucket $b_i$ and c reference exactly the same region, $b_i$'s frequency is replaced with $T_c$. This is because c and $b_i$ represent essentially the same space so an additional hole would not be appropriate. 2) If c completes $b_i$'s space such that the sum of all $b_i$'s children including c would represent the entire space of $b_i$, $b_i$ is merged with its parent and c is then made a child of $b_i$'s parent. 3) If neither 1) nor 2) applies, a new child of $b_i$, denoted $b_n$, with box($b_n$)=c and f($b_n$)=$T_c$ is created. All of $b_i$'s children whose bounding boxes are completely included in c are moved so they become children of the new bucket $b_n$. The frequency of $b_i$ is restored, whenever possible, to the previous frequency counts. If $f(b_i) \geq T_c$, $T_c$ is subtracted from $f(b_i)$. Otherwise $f(b_i)$ is set to zero.

In step 470, the number of buckets including any new buckets is compared to the total bucket budget number N obtained in step 410. If the number of buckets exceeds the budget, the similar buckets are merged in step 480 to get the total number of buckets below the budget. Two buckets are similar if they have a close tuple density.

EXAMPLE 3

Figure 7:
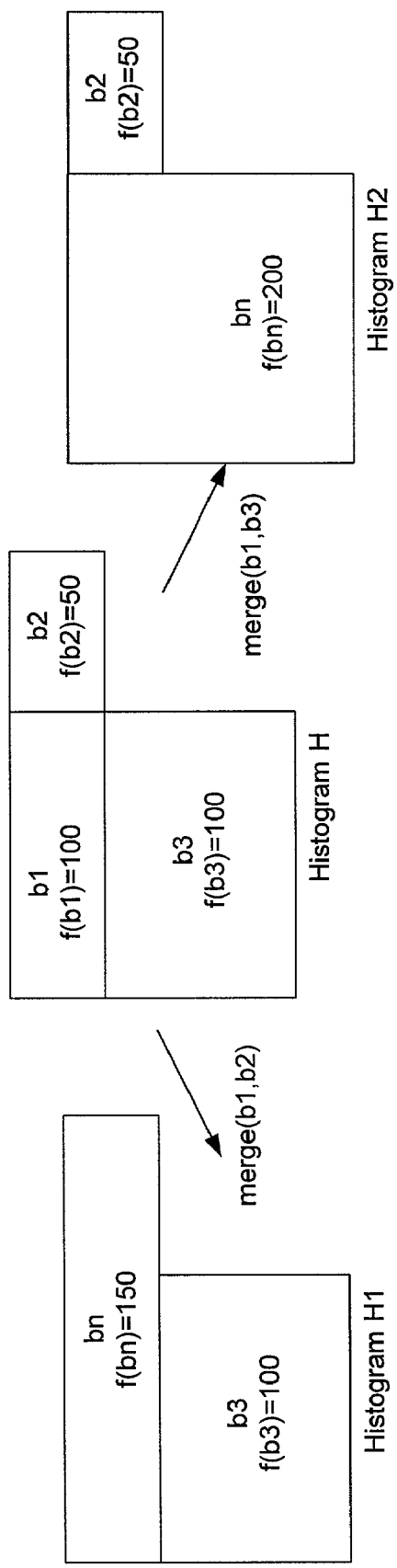
FIG. 7 is a block diagram of the practice of an aspect of the present invention.

FIG. 7 depicts a three bucket histogram H. Given a two bucket budget, buckets $b_1$ and $b_2$ can be merged resulting in histogram $H_1$ or buckets $b_1$ and $b_3$ can be merged resulting in histogram $H_2$. Although buckets $b_1$ and $b_3$ have the same frequency in H (100 tuples each), histogram $H_1$ is more similar to the original, three bucket histogram H than is $H_2$. In fact, both H and $H_1$ result in the same selectivity estimation for arbitrary range queries, since $b_1$ and $b_2$'s densities are the same in $H_1$. In contrast, histogram $H_2$ returns lower selectivity estimations than H for range queries that only cover the lower half of new bucket $b_n$, since the tuple density of bucket $b_3$ is lower than the tuple density of bucket $b_1$ in histogram H.

A penalty function is used to return the cost of merging a pair of buckets. If two buckets $b_1$ and $b_2$ from histogram H are to be merged to form H', the penalty of the merging of $b_1$ and $b_2$ is:

$$penalty(H, b_1, b_2) = \int_{p \in dom(D)} |est(H, p) - est(H', p)| dp$$

where dom(D) is the domain of the data set D. In other words, the penalty for merging two buckets measures the difference in approximation accuracy between the old, more expressive histogram where both buckets are separate and the new, smaller histogram where the buckets have been collapsed. A merge with a small penalty will result in little difference in approximation for range queries and therefore will be preferred over another merge with higher penalty. Since estimated density of tuples inside a bucket is constant by definition, penalty functions can be calculated efficiently. All regions $r_i$ in the data domain with uniform density of tuples are identified before and after the merge, and a finite number of terms of the form $|est(H, r_i) - est(H', r_i)|$ is added as explained below.

There are two families of merges that correspond to merging adjacent buckets in the tree representation of the histogram: parent-child merges and sibling-sibling merges. In a parent-child merge, a bucket is merged with its parent. In a sibling-sibling merge, two buckets with the same parent are merged possibly taking some of the parent space (since both siblings must be enclosed in a rectangular bounding box). Parent-child merges are useful to eliminate buckets that become too similar to their parents, e.g., when their own children cover all interesting regions and therefore carry all useful information. Sibling-sibling merges are useful to extrapolate frequency distributions to yet unseen regions in the data domain, and also to consolidate buckets with similar density that cover close regions.

EXAMPLE 4

Figure 8:
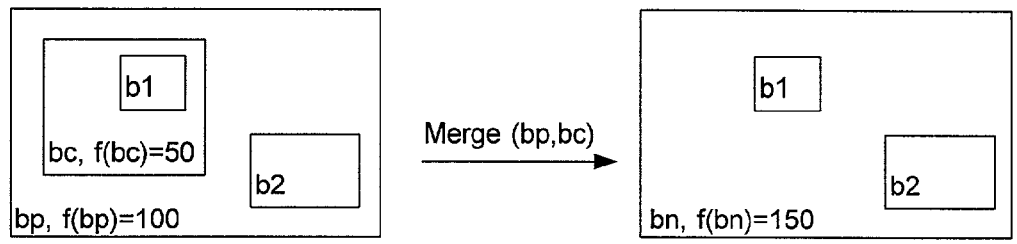
FIG. 8 is a block diagram of the practice of an aspect of the present invention.

FIG. 8 illustrates a parent-child merge of buckets $b_c$ (child) and $b_p$ (parent). After the merge a new bucket $b_n$ replaces $b_p$, and the bucket $b_c$ disappears. The new bucket $b_n$ has box($b_n$)=box($b_p$) and $f(b_n)=f(b_c)+f(b_p)$. Therefore, $v(b_n)=v(b_c)+v(b_p)$. The only regions in the original histogram that change the estimated number of tuples after the merge are $b_p$ and $b_c$. The penalty of merging $b_p$ and $b_c$ is:

$$penalty(H, b_p, b_c) = \left| f(b_p) - f(b_n)\frac{v(b_p)}{v(b_n)} \right| + \left| f(b_c) - f(b_n)\frac{v(b_c)}{v(b_n)} \right|$$

where H' is the histogram that results from merging $b_p$ and $b_c$ in H. The remaining points p in the histogram domain are such that est(H,p)=est(H',p), so they do not contribute to the penalty.

EXAMPLE 5

Figure 9:
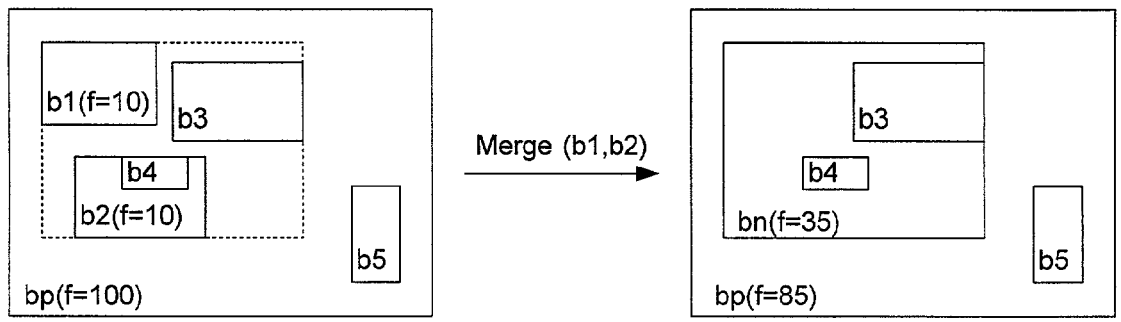
FIG. 9 is a block diagram of the practice of an aspect of the present invention.

FIG. 9 illustrates a sibling-sibling merge of buckets $b_1$ and $b_2$ with common parent $b_p$. The bounding box of the resulting bucket $b_n$ is determined as the smallest box that encloses both $b_1$ and $b_2$ and does not intersect partially with any other child of $b_p$. In the extreme situation, box($b_n$) is equal to $b_p$ and the sibling-sibling merge is transformed into two parent merges, $b_1$ and $b_p$, and $b_2$ and $b_p$. Otherwise, the set I of participant buckets is defined as the set of $b_p$'s children (excluding $b_1$ and $b_2$) that are included in box($b_n$). After the merge, the new bucket $b_n$ replaces buckets $b_1$ and $b_2$. In general, $b_n$ will also contain some portion of the old $b_p$. The volume of the portion is $v_{old}$=vBox($b_n$)−(vBox($b_1$)+vBox($b_2$)+$\Sigma_{bi \in I}$vBox($b_i$)). Therefore, the frequency of the new bucket is f($b_n$)=f($b_1$)+f($b_2$)+f(($b_p$)$v_{old}$/v($b_p$)). Also, the modified frequency of $b_p$ in the histogram becomes f($b_p$)(1−$v_{old}$/v($b_p$)). To complete the merge, the buckets in I and the children of the old $b_1$ and $b_2$ become children of the new $b_n$. Therefor v($b_p$)=$v_{old}$+v($b_1$)+v($b_2$). The only regions in the original histogram that change the estimated number of tuples after the merge are the ones corresponding to $b_1$, $b_2$ and the portion of $b_p$ enclosed by box($b_n$).

Hence:

$$penalty(H, b_1, b_2) = \left| f(b_n)\frac{v_{old}}{v(b_n)} - f(b_p)\frac{v_{old}}{v(b_p)} \right| + \left| f(b_1) - f(b_n)\frac{v(b_1)}{v(b_n)} \right| + \left| f(b_2) - f(b_n)\frac{v(b_2)}{v(b_n)} \right|$$

Where H' is the histogram that results from merging $b_1$ and $b_2$ in H, and $r_{old}$ is the portion of the old bucket $b_p$ covered by the new bucket $b_n$. The remaining points p in the histogram are such that est(H,P)=est(H',p), so they do not contribute to the merge penalty.

As can be seen from the foregoing description the method of updating histograms of the present invention allows buckets to be nested and tunes the histogram to the specific query workload received by the database system. Buckets are allocated where needed the most as indicated by the workload, which leads to improved query selectivity estimations.

In the foregoing description, the invention has been described with reference to specific exemplary embodiments thereof. It will, however, be evident that various modifications and changes may be made thereto without departing from the broader spirit or scope of the present invention as defined in the appended claims. The specification and drawings are, accordingly, to be regarded in an illustrative rather that a restrictive sense.

We claim:

1. In a database system, a method of maintaining a self-tuning histogram having a plurality of existing buckets arranged in a hierarchical manner and defined by at least two bucket boundaries that represent a range of attribute values, a bucket volume, and a bucket frequency that corresponds to a number of tuples having attribute values that fall in the bucket boundary range comprising:
   creating at least one new bucket in response to a query on the database, each new bucket having bucket boundaries corresponding to a range of tuple attribute values returned by the query and a bucket frequency corresponding to a number of tuples returned by the query;
   establishing a logical relationship between the new bucket and an existing bucket such that the existing bucket is a parent bucket of the new bucket;
   storing the self-tuning histogram that includes the new bucket in memory; and
   wherein bucket boundaries of each new bucket fall within bucket boundaries of the parent bucket of the new bucket.

2. The method of claim 1 wherein each bucket has a rectangular shape.

3. The method of claim 1 wherein a child bucket forms a hole in the parent bucket of the child bucket.

4. The method of claim 1, further comprising merging buckets based on a merge criterion when the total number of buckets exceeds a predetermined budget.

5. The method of claim 4 wherein the merge criterion is a similar bucket density, wherein bucket density is based on the bucket frequency divided by the bucket volume.

6. The method of claim 1 further comprising shrinking the boundaries of a new bucket if the boundaries of the new bucket intersect any existing bucket boundaries.

7. The method of claim 1 wherein the frequency of the parent bucket is diminished by the frequency of the child bucket.

8. In a database system, a method of maintaining a self-tuning histogram having a plurality of existing parent buckets arranged in a hierarchical manner and defined by at least two bucket boundaries that represent a range of attribute values, a bucket volume, and a bucket frequency that corresponds to a number of tuples having attributes that fall in the bucket boundary range, the method comprising:
   a) examining the results of a query executed on the database;
   b) creating at least one candidate hole in the histogram based on the results of the query such that the candidate hole has boundaries corresponding to a range of attribute values returned by the query and a frequency corresponding to a number of tuples returned by the query;
   c) modifying the boundaries of each candidate hole such that the boundaries of the modified hole are completely contained within the boundaries of at least one existing parent bucket and do not partially intersect the boundaries of any existing bucket;
   d) creating a new child bucket that has a child frequency in the histogram corresponding to each modified hole; and
   e) storing the modified self-tuning histogram in one or more computer-readable media.

9. The method of claim 8 wherein each bucket has a rectangular shape.

10. The method of claim 8 wherein a total number of buckets is limited to a predetermined budget.

11. The method of claim 10 comprising merging buckets based on a merge criterion when the total number of buckets exceeds the predetermined budget.

12. The method of claim 11 wherein the merge criterion is a similar bucket density, wherein bucket density is based on the bucket frequency divided by the bucket volume.

13. The method claim 8 wherein the frequency of the parent bucket is diminished by the frequency of the child bucket.

14. One or more computer readable media having executable instructions that, when executed, implement a method for maintaining a self-tuning histogram having a plurality of existing parent buckets arranged in a hierarchical manner and defined by at least two bucket boundaries that represent a range of attribute values, a bucket volume, and a bucket frequency that corresponds to a number of tuples having attribute values that fall in the bucket boundary range, the steps comprising:
  a) examining the results of a query executed on the database;
  b) creating at least one candidate hole in the histogram based on the results of the query such that the candidate hole has boundaries corresponding to a range of attribute values returned by the query and a frequency corresponding to a number of tuples returned by the query;
  c) modifying the boundaries of each candidate hole such that the boundaries of the modified hole are completely contained within the boundaries of at least one existing parent bucket and do not partially intersect the boundaries of any existing bucket; and
  d) creating a new child bucket that has a child frequency in the histogram corresponding to each modified hole; and
  e) storing the modified self-tuning histogram in one or more computer-readable media.

15. The one or more computer readable media of claim 14 wherein each bucket has a rectangular shape.

16. The one or more computer readable media of claim 14 wherein the method further comprises merging buckets having a similar bucket density when the total number of buckets exceeds a predetermined budget.

17. An apparatus for maintaining a self-tuning histogram having a plurality of existing parent buckets arranged in a hierarchical manner and defined by at least two bucket boundaries that represent a range of attribute values, a bucket volume, and a bucket frequency that corresponds to a number of tuples having attribute values that fall in the bucket boundary range comprising:
  a) means for examining the results of a query executed on the database;
  b) means for creating at least one candidate hole in the histogram based on the results of the query such that the candidate hole has boundaries corresponding to a range of attribute values returned by the query and a frequency corresponding to a number of tuples returned by the query;
  c) means for modifying the boundaries of each candidate hole such that the boundaries of the modified hole are completely contained within the boundaries of at least one existing parent bucket and do not partially intersect the boundaries of any existing bucket; and
  d) means for creating a new child bucket that has a child frequency in the histogram corresponding to each modified hole.

18. An apparatus that maintains a self-tuning histogram having a plurality of existing parent buckets arranged in a hierarchical manner and defined by at least two bucket boundaries that represent a range of attribute values, a bucket volume, and bucket frequency that corresponds to a number of tuples having attribute values that fall in the bucket boundary range comprising:
  a) a memory device that stores a database comprising multiple data records;
  b) a computer having one or more processing units that execute a stored computer program, said computer including a rapid access memory store; and
  c) an interface that couples the memory device that stores the database to the computer to allow records to be retrieved from the database; wherein
  d) the stored program has components including i) a component that examines the results of a query executed on the database; ii) a component that creates at least one candidate hole in the histogram based on the results of the query such that the candidate hole has boundaries corresponding to a range of attribute values returned by the query and a frequency corresponding to a number of tuples returned by the query; iii) a component that modifies the boundaries of each candidate hole such that the boundaries of the modified hole are completely contained within the boundaries of at least one existing parent bucket and do not partially intersect the boundaries of any existing bucket; and iv) a component that creates a new child bucket that has a child frequency in the histogram corresponding to each modified hole.

19. For use with a database system, a histogram tuning system comprising:
  a component that receives a histogram having at least a parent bucket; and
  a tuning component that iteratively populates the parent bucket with a child bucket, as a function of query results, wherein the child bucket is completely contained within the parent bucket.

20. The histogram tuning system of claim 19 wherein the tuning component populates the parent bucket with a child bucket that has boundaries corresponding to a range of attribute values present in the query results and a child bucket frequency corresponding to a number of tuples present in the query results.

21. The histogram tuning system of claim 19 comprising a merging component that merges buckets based on a merge criteria.

22. The histogram tuning system of claim 21 wherein the merge criterion is a similar bucket density.

23. The histogram tuning system of claim 19 wherein the tuning component shrinks the boundaries of the child bucket if the child bucket boundaries intersect any other bucket boundaries.

24. The histogram tuning system of claim 20 wherein the parent bucket has a parent bucket frequency and the parent bucket frequency is diminished by the child bucket frequency.

25. A database histogram tuning system comprising:
  means for receiving a bucket from a histogram; and
  means for iteratively populating the bucket with a child bucket, as a function of query results, such that the child bucket is fully contained within the received bucket.

* * * * *

UNITED STATES PATENT AND TRADEMARK OFFICE
CERTIFICATE OF CORRECTION

| | |
|---|---|
| PATENT NO. | : 7,007,039 B2 |
| APPLICATION NO. | : 09/881500 |
| DATED | : February 28, 2006 |
| INVENTOR(S) | : Surajit Chaudhuri et al. |

It is certified that error appears in the above-identified patent and that said Letters Patent is hereby corrected as shown below:

In column 1, line 31, after "based on" delete "he" and insert -- the --, therefor.

In column 7, line 1, delete "$b_n$is" and insert -- $b_n$ is --, therefor.

In column 12, line 3, in Claim 18, after "volume, and" insert -- a --.

Signed and Sealed this

Twenty-ninth Day of September, 2009

David J. Kappos
*Director of the United States Patent and Trademark Office*